US010922132B1

(12) United States Patent
Shiramshetti et al.

(10) Patent No.: US 10,922,132 B1
(45) Date of Patent: Feb. 16, 2021

(54) SECURE MIGRATION OF SERVERS FROM CUSTOMER NETWORKS TO SERVICE PROVIDER SYSTEMS

(71) Applicant: Amazon Technologies, Inc., Seattle, WA (US)

(72) Inventors: Nagaraju Shiramshetti, Santa Clara, CA (US); Keshav Sethi Attrey, Cupertino, CA (US); Sumeet Talwar, Santa Clara, CA (US); Levente Csaba Tamasi, Palo Alto, CA (US); Nicholas King Bendler, San Francisco, CA (US); Vivek Chawda, Albany, CA (US)

(73) Assignee: Amazon Technologies, Inc., Seattle, WA (US)

( * ) Notice: Subject to any disclaimer, the term of this patent is extended or adjusted under 35 U.S.C. 154(b) by 108 days.

(21) Appl. No.: 15/837,786

(22) Filed: Dec. 11, 2017

(51) Int. Cl.
*G06F 9/48* (2006.01)
*H04L 9/08* (2006.01)
*G06F 3/06* (2006.01)
*G06F 21/62* (2013.01)
*G06F 9/50* (2006.01)
*G06F 9/455* (2018.01)
*G06F 21/57* (2013.01)

(52) U.S. Cl.
CPC .......... *G06F 9/4856* (2013.01); *G06F 3/0647* (2013.01); *G06F 9/45558* (2013.01); *G06F 9/5077* (2013.01); *G06F 21/6209* (2013.01); *H04L 9/0819* (2013.01); *G06F 21/57* (2013.01); *G06F 2009/4557* (2013.01); *G06F 2009/45587* (2013.01); *G06F 2221/2107* (2013.01)

(58) Field of Classification Search
None
See application file for complete search history.

(56) References Cited

U.S. PATENT DOCUMENTS

| 2011/0022642 | A1* | 1/2011 | deMilo | G06F 21/602 707/805 |
| 2015/0318986 | A1* | 11/2015 | Novak | H04L 63/0428 713/189 |
| 2018/0307522 | A1* | 10/2018 | Wu | H04L 41/0886 |
| 2019/0056966 | A1* | 2/2019 | Baboval | G06F 16/2255 |

\* cited by examiner

*Primary Examiner* — Wynuel S Aquino
(74) *Attorney, Agent, or Firm* — Nicholson De Vos Webster & Elliott LLP

(57) ABSTRACT

Techniques for securely migrating servers from customer networks into service provider systems are described. A backup proxy can be deployed in a customer's network and associated with one or more servers in the customer's network and with a server migration service of a service provider system. A customer can identify a server in the customer's network to migrate and the server migration service coordinates the migration with the backup proxy. The backup proxy can be instructed to obtain replication data for the server, obtain an encryption key associated with the customer from a key management service (KMS), encrypt the replication data, and upload the encrypted replication data to the service provider system. The service provider system can obtain the same encryption key used to encrypt the replication data from the KMS and decrypt the uploaded encrypted replication data to generate migrated server resources at the service provider system.

20 Claims, 7 Drawing Sheets

SECURE MIGRATION OF SERVERS FROM CUSTOMER NETWORKS TO SERVICE PROVIDER SYSTEMS

BACKGROUND

As an increasing number of applications and services are being made available over networks such as the internet, an increasing number of content, application, and service providers are turning to technologies such as cloud computing. Cloud computing, in general, is an approach to providing access to electronic resources through services, such as web services, where the hardware and software used to provide those services are dynamically scalable to meet the needs of users of the services at any given time. A user (or "customer") typically rents, leases, or otherwise pays for access to resources provided by a service provider's system and thus can avoid purchasing and maintaining the underlying hardware and software at a customer's site.

In this context, many cloud computing service providers use virtualization and multi-tenant architectures to allow multiple users to share the service provider's underlying hardware and software resources. Virtualization allows servers, storage devices, and other hardware resources to be partitioned into multiple isolated instances that can be assigned to and used by many different users. Multiple users can concurrently use a cloud computing provider's resources thereby increasing the number of users a service provider can support and reducing the management and financial costs to both the service provider and its customers.

BRIEF DESCRIPTION OF DRAWINGS

Various embodiments in accordance with the present disclosure will be described with reference to the drawings, in which.

DETAILED DESCRIPTION

Figure 1:
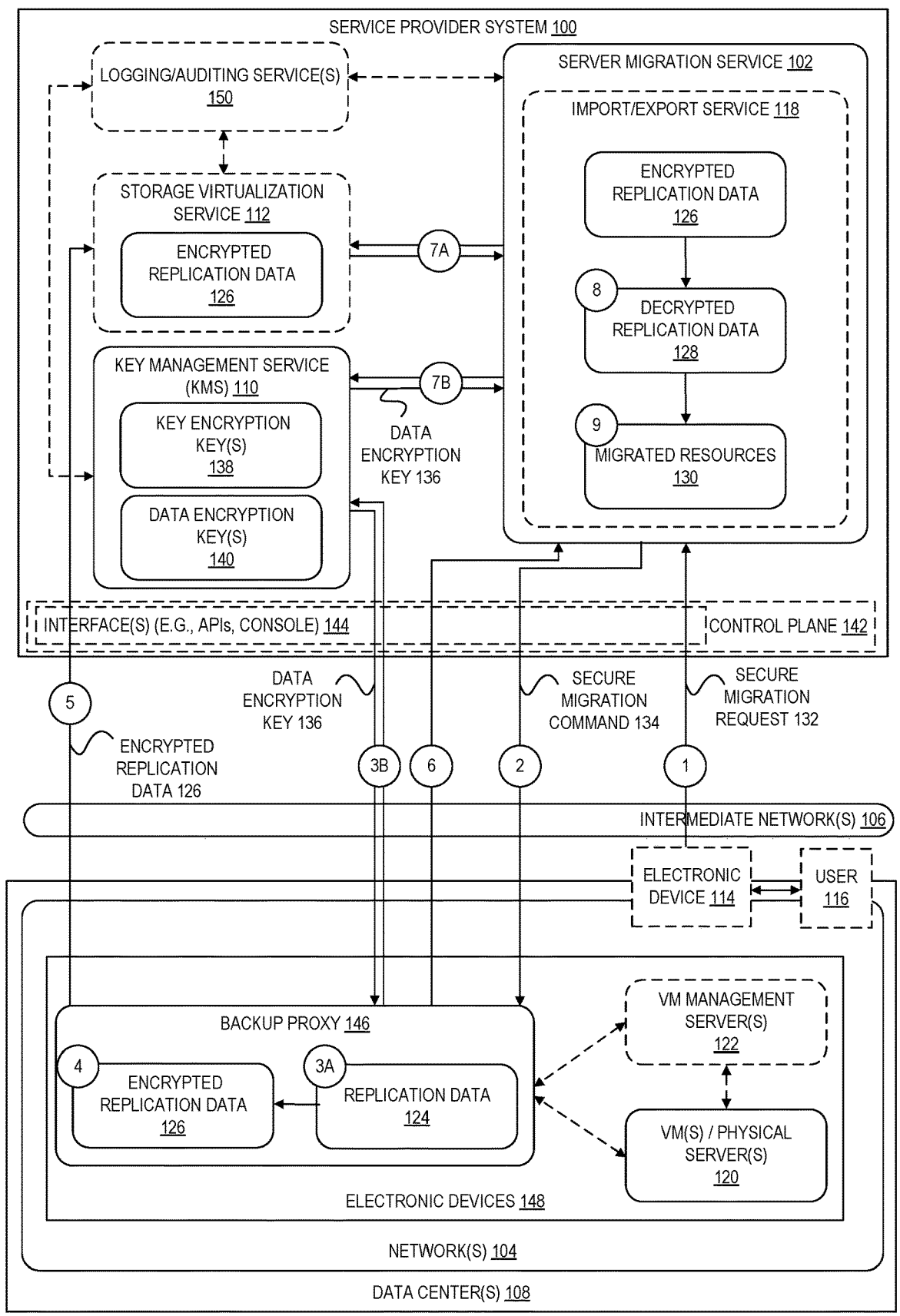
FIG. 1 is a block diagram illustrating an environment for securely migrating servers to a service provider system according to some embodiments.

Various embodiments of methods, apparatuses, systems, and non-transitory computer-readable media enable the secure migration of servers from customers' on-premises data centers and into systems managed by third-party computing resource service providers (commonly referred to as "cloud computing" service providers). According to some embodiments, a service provider system includes a server migration service that customers can use to initiate the secure migration of one or more selected servers—for example, virtual machines (VMs) or physical servers—which automates many aspects of the secure migration process. The server migration service coordinates the migration process with the assistance of one or more "backup proxies" installed in a customer's network, sometimes also referred to as "connectors." A backup proxy can be any type of software application (for example, a special purpose VM, an operating system agent, or a standalone application) that "connects" the server migration service with VMs or physical servers in a customer's data center such that the server migration service can indirectly interact with the servers to perform migration-related operations.

To perform a secure server migration, the server migration service can instruct a backup proxy located in the customer's network to obtain replication data (for example, one or more disk snapshots) for the server to be migrated. In an embodiment, the backup proxy obtains the replication data (for example, via a VM management server or directly from the server) and obtains an encryption key associated with the customer from a key management service (KMS) which, in some examples, is a separate service provided by the service provider system. The backup proxy encrypts the replication data with the encryption key to obtain encrypted replication data and sends, or uploads, the encrypted replication data to the service provider system using a secure network connection (for example, using a Hypertext Transfer Protocol Secure (HTTPS) connection).

Once the encrypted replication data is uploaded to the service provider system, the server migration service obtains from the KMS the same encryption key used by the backup proxy to encrypt the replication data at the customer's site and uses the encryption key to decrypt the replication data. The server migration service can use the decrypted replication data to create various migrated resources at the service provider system (for example, disk volumes, disk snapshots, and machine images) that can be used to launch instances of the migrated server at the service provider system. Some or all of these migrated resources can also be encrypted using the same encryption key or a different encryption key for additional security at the service provider system.

In this manner, a customer's on-premises servers can be securely migrated to a service provider system using the customer's own encryption keys to encrypt and decrypt replication data used to migrate the servers at various stages of the process—for example, when the replication data is located at the customer's data center, while the data is in transit to the service provider system, and when the data is stored and processed at the service provider system. The use of a customer's own encryption keys provides customers with greater control and visibility into the server migration process and enables the migration of server data across multiple and heterogenous platforms (for example, across third party VM systems and various service provider system services), across different types of data centers (for example, from on-premises data centers to service provider system data centers), and across hardware controlled by different entities (for example, from hardware controlled by a customer's company to hardware controlled by a service provider system). For example, the use of a customer's encryption keys to encrypt and decrypt the replication data during the migration can be audited by the customer and, if a customer ever becomes concerned about the security of data migrated into the service provider system, the customer can disable or revoke the encryption keys used to encrypt the data, thereby rendering the encrypted migrated resources inaccessible to others.

As indicated above, in recent years, organizations have begun to realize the benefits of moving their computing resources—for example, servers, data storage, networks, and applications—out of their existing on-premises data centers and into systems managed by third-party service providers. These service provider systems typically provide a wide variety of configurable computing resources that can be provisioned and accessed over the internet, often using a "pay-as-you-go" or similar payment model. The ability to readily obtain such computing resources from these service providers eases many of the burdens organizations face in managing on-premises data centers which tend to be expensive to maintain and frequently encounter scalability and resiliency issues.

A common type of computing resource offered by these types of service providers is compute capacity which is typically obtained by customers in the form of virtual computing resources, or VM instances. These VM instances, which are hosted by a service provider on physical computing devices with their own operating systems and other software components, can be used in much the same manner as physical computers. As one example, software developers can use VM instances provisioned at a service provider system to host developed applications including virtually any types of applications and services. However, many customers may have existing data centers including VMs, hosted applications, and so forth, and may not desire to recreate these environments at a service provider system from scratch. These and other customers may thus desire the ability to move, or "migrate," their VMs and other resources into a service provider system such that their existing servers are essentially replicated at the service provider system.

To assist with the process of migrating servers from on-premises data centers, some service provider systems include server migration services that help automate many of the operations involved in migrating servers. For example, a server migration service, in coordination with a backup proxy installed in the customer's network, may be configured to automatically cause the creation of replication data (for example, disk images) for the servers to be migrated at the customer's site, cause the replication data to be sent to the service provider system, and to generate migrated resources (for example, disk snapshot, VM images) that can be used to create VM instances in the service provider system replicating those at the customer's site.

However, some customers may be responsible for managing on-premises servers and other data that are subject to various organizational policies, industry regulations, or government regulations, restricting the ways in which the servers and data can be used by and transmitted to other entities. For example, for organizations handling various types of medical or health-related information, the Health Insurance Portability and Accountability Act of 1966 (HIPAA) provides data privacy and security provisions that such organizations may be required to follow to safeguard the information. As another example, the Payment Card Industry Data Security Standard (PCI DSS) provides industry standards for organizations handling credit card information. In these and other instances, customers might feel uncomfortable or may be unable to migrate their servers into a service provider system without certain assurances about the security of the data during the migration process. The desired security assurances may extend to both when the customer's data is "at rest" (for example, when the data is stored within the customer's data center and when the data is stored within the service provider's system) and when the data is "in-transit" (for example, when the data is moving from the customer's data center to the service provider's system via one or more networks). In addition to assurances related to the security of data used to migrate servers from on-premises data centers, some customers may desire additional information related to how and when the data is accessed by various components of the service provider system during and after the migration process.

Embodiments described herein enable a secure, end-to-end server migration process that satisfies customers' concerns about migrating their servers and associated data into a service provider's system, among other benefits.

FIG. 1 is a block diagram illustrating an environment for securely migrating servers to a service provider system according to some embodiments. In an embodiment, a server migration service 102 operates as part of a service provider system 100 and comprises one or more software modules executed by one or more electronic devices at one or more data centers and geographic locations.

A service provider system 100 provides users with the ability to use a variety of types of computing resources such as compute capacity (for example, executing VM instances, containers, batch jobs, code without provisioning servers), data storage resources (for example, object storage, block-level storage, data archival storage), network-related resources (for example, configuring virtual networks including groups of computing resources, content delivery networks (CDNs), Domain Name Services (DNS)), application resources (for example, databases, application build and deployment services), and so forth. These and other computing resources may be provided as services, such as a hardware virtualization service (not shown) that can execute compute instances, a storage virtualization service 112 that can store data objects, logging/auditing services 150 that can monitor and log activity at the service provider system 100, and so forth. The customers of the service provider system 100 may use user accounts associated with a customer account, though these terms may be used somewhat interchangeably depending on context of use. Users may interact with a service provider system 100 across one or more intermediate networks 106 (for example, the internet) via one or more interfaces 144, which may include the use of application programming interface (API) calls, via a management console implemented via a website or standalone application. These interfaces 144 may be part of, or serve as a front-end to, a control plane 142 of the service provider system 100 that includes "backend" services supporting and enabling various services (for example, including the server migration service 102, KMS 110, storage virtualization service 112, logging/auditing services 150, among many other possible services).

To provide these and other computing resource services, service provider systems 100 often rely upon virtualization techniques. For example, virtualization technologies can be used to provide users the ability to control and use compute instances (for example, a VM using a guest operating system that operates using a hypervisor that may or may not operate in a VM, an instance that can execute on "bare metal" hardware without an underlying hypervisor, and so forth), where one or more compute instances can be implemented using a single electronic device. Thus, a user may directly utilize a compute instance hosted by the service provider system to perform a variety of computing tasks, or may indirectly utilize a compute instance by submitting code to be executed by the service provider system, which in turn utilizes a compute instance to execute the code (typically without the user having any control of or knowledge of the underlying compute instance(s) involved).

As indicated above, it has become desirable at times for customers to move servers (for example, one or more VMs or physical servers 120) out of customer data centers 108 and into service provider systems such as service provider system 100 (for example, to be run as one or more compute instances) for any of a number of benefits including increased scalability and stability provided by service provider systems 100, reduced management and infrastructure costs, and so forth.

For example, FIG. 1 shows one or more customer networks 104 with one or more servers (for example, VMs or physical servers 120) executed by one or more electronic devices 148 located within one or more data centers 108. VMs 120 are often implemented along with a virtual machine monitor (VMM) (not shown) that provides an execution environment for the VMs on the host electronic device. In many environments, VMs 120 are independently or collectively managed using one or more VM managements servers 122. For example, a VM management server 122 may be configured to manage a group of VMs, such as some or all of the VMs executed within a data center. VM management servers 122 provide a centralized system for managing the lifecycle of its managed VMs including the ability to start and stop VMs, create complete or incremental snapshots (or backups) of VMs, restore VMs, modify permissions, functionalities, and configurations of VMs, and so forth.

To perform migrations of on-premises servers to a service provider system 100, in some embodiments, a customer can deploy and configure one or more backup proxies 146 in a customer network 104. A backup proxy, in some embodiments, is a software application (for example, a special purpose VM or a standalone application) that "connects" the server migration service 102 with the VMs 120 via one or more VM management servers 122 and that allows the server migration service 102 to indirectly perform migration-related operations upon the VMs 120. As one example, a backup proxy could be a FreeBSD VM in Open Virtualization Format (OVA) that can be downloaded from the service provider system 100. To deploy a backup proxy 146, a customer can install or execute the backup proxy on an electronic device (for example, a server device) that has connectivity within a customer network 104 to reach one or more VM management servers 122 and the server migration service 102.

As indicated above, a backup proxy 146 acts as a local on-premises manager for certain operations of the secure migration process. For example, the backup proxy may provide one or more of the following functionalities related to the secure migration process: collection of replication data (for example, disk snapshots) from servers 120 via VM management servers 122, obtaining encryption keys from a KMS 110, using the obtained encryption keys to encrypt replication data, and sending encrypted replication data to a service provider system 100 using a secure connection. In some embodiments, a customer configures a backup proxy 146 with credentials used to communicate with one or more VM manager servers 122 (for example, a vCenter Server™ by VMWare® or a System Center Virtual Machine Manager (SCVMM) by Microsoft®) in the customer network as well as credentials used to communicate with the service provider system 100. In an embodiment, a customer identifies which VMs 120 are desired for migration and the server migration service 102 can automatically assign migration operations to a backup proxy 146. In some embodiments, the server migration service 102 may send messages to a backup proxy 146 via a message service (for example, a message queuing service) or may "piggy-back" on health messages that the backup proxy 146 is configured to send.

In an embodiment, a console 144 is configured with user interface elements that allow a user 116 to initiate and optionally configure other aspects of a secure server migration, for example, to identify the VMs 120 to be migrated and, optionally, to identify an encryption key associated with the customer to use for the migration. In this manner, a user can use a console 144 to initiate a secure migration process by sending a secure migration request 132 to a server migration service 102 (as shown at the circle labeled "1" in FIG. 1). The secure migration request 132, for example, can include an indication of the one or more servers the user 116 desires to migrate to the service provider system 100. For example, the user 116 may use an interface 144 (for example, a console) to acquire a list of VMs 120 that have been "registered" with the server migration service 102 (for example, via configuration data sent from backup proxy 146 to the server migration service 102 under the customer's account). The user 116 may then, for example, select one or more of these VMs 120 that are desired to be migrated and further provide input indicating a desire for the selected servers to be securely migrated (for example, including selection of a key encryption key, as described in more detail below), the input causing the electronic device 114 to issue a secure migration request 132 (for example, an API call, a HyperText Markup Language (HTML) form submission, and so forth) identifying which of the VMs 120 are to be migrated.

In an embodiment, at circle "2," the server migration service 102 sends a secure migration command 134 to a backup proxy 146 in response to receiving a secure migration request 132. In some embodiments, the sending of a secure migration command 134 uses, for example, a polling mechanism wherein a backup proxy 146 periodically checks with the server migration service 102 (for example, via a RESTful API call to an API endpoint) to determine whether there are new migration requests for the backup proxy and, in response, the server migration service 102 can send any pending secure migration commands 134. In other embodiments, "push" messaging techniques such as Web push, HyperText Transfer Protocol (HTTP) server push, long polling, and so forth, can be used to notify a backup proxy 146 of a secure migration request 132. The secure migration command 134, in some embodiments, identifies one or more operations that the recipient backup proxy 146 is to perform and an identifier of a VM 120 that the backup proxy 146 is to perform the operations upon.

In an embodiment, a backup proxy 146 receiving a secure migration command 134 performs the assigned migration operations. The performance of the assigned operations can include sending commands to an associated VM management server 122 (for example, to cause it to perform certain operations with the VMs sought to be migrated) or possibly interacting directly with the VMs to perform the operations. A variety of different types of operations may be performed by a backup proxy in response to the secure migration command 134 including, but not limited to, validating a received replication job; creating a base (or "full") snapshot of the identified VM's disk(s), memory, or both; creating a delta or "incremental" snapshot; obtaining an encryption key from a key management service 110; encrypting data (for example, the created snapshots) using the obtained encryption key; creating a storage location (or "bucket") within the service provider system 100 (for example, using a storage virtualization service 112); uploading a base snapshot to the storage location; uploading a delta snapshot to the storage location; deleting artifacts that have already been uploaded (for example, a snapshot); consolidating a snapshot, and so forth.

For example, in some embodiments, a backup proxy 146 performs part of a secure migration of a VM or physical server 120 by obtaining a full snapshot of the VM or physical server, obtaining an encryption key associated with the customer from a key management service 110, encrypting the snapshot with the obtained encryption key, creating a data storage object (for example, a "bucket" or "folder") at a storage virtualization service 112, and uploading the snapshot for storage in the data storage object. Similarly, if the secure migration command 134 is for a delta migration of a VM or physical server 120, the backup proxy 146 can obtain a delta snapshot of the VM or physical server, obtain an encryption key, encrypt the delta snapshot, and upload the encrypted delta snapshot to the service provider system. In other embodiments, instead of or in addition to discrete snapshots, a backup proxy can obtain a stream of data reflecting changes to a VM or physical server 120 and the streamed data can be encrypted and uploaded to the service provider system (either each time a change is received or by batching the changes and periodically uploading the data). For example, an agent may be installed in the operating system (OS) of a physical server or an agent can interact with a hypervisor hosting a VM such that a filter driver streams information reflecting data written to a physical or virtual disk to the backup proxy 146.

At circle "3A," for example, a backup proxy 146 may request a snapshot of a VM 120 identified in the secure migration command 134 from a VM management server 122 and receive the snapshot generated by the VM management server 122. As another example, an I/O filter driver agent can be installed in the OS of a physical server 120 and used to capture a snapshot of the server obtained by the backup proxy 146. In other embodiments, OS-level disk snapshots can be obtained (for example, using a volume shadow copy service (VSS)) or a third-party storage array snapshot can be obtained.

At circle "3B," the backup proxy 146 sends a request to the KMS 110 for an encryption key associated with the customer account under which the replication is taking place (for example, the customer account associated with the initial secure migration request 132). In an embodiment, the request to the KMS 110 includes an identifier of a "key encryption key" (KEK) used to obtain the encryption key 136. For example, the identifier of the KEK can be included in the initial secure migration request 132 and forwarded to the backup proxy 146 as part of the secure migration command 134.

In general, a KMS 110 is a service that allows customers to create and control encryption keys that can be used to encrypt the customers' data. In one embodiment, the KMS 110 is a service of the service provider system 100 and can be integrated with other services of the service provider system to help customers protect data stored in the services. The KMS 110 can also provide customers with the ability to encrypt and decrypt data outside of the service provider system 100, for example, within customer networks 104. In other embodiments, the KMS 110 is a third-party service managed outside of the service provider system 100 and can similarly be used to allow customers to protect data at the service provider system 100 and locally at customer networks 104. In general, the KMS 110 can be any key management system that is accessible to at least one component located in the customer's network 104 and at least one component of the service provider system 100.

In an embodiment, the KMS 110 and other services of service provider system 100 may be integrated with logging/auditing services 150 to provide logs of encryption key usage and other activity performed by components of the service provider system 100, for example, to help meet customers' regulatory and compliance needs. For example, a logging/auditing service 150 can be used to log each request made to the KMS 110, including what request was made (for example, a request to create a new encryption key, encrypt data, decrypt data, and so forth), a source IP address from which the request was made, a user account associated with the request, when the request was made, and so on. As another example, a logging/auditing service 150 can be used to log activity occurring at a storage virtualization service 112 (for example, to log when replication data 126 is stored and accessed at the service), activity occurring at a server migration service 102 (for example, to log when secure migration requests 132 are received, when migrated replication data 126 is accessed, when migrated sources 130 are created, and so forth), and activity occurring other services internal or external to the service provider system 100. This information can be used by customers to obtain visibility into which components of the service provider system 100 access the customer's migrated server data during the migration process and beyond. In some embodiments, for example, a user can configure logging/auditing services 150 to log certain activities of interest to the user related to the secure migration process, and further configure the generation of notifications or alerts upon the occurrence of certain activities (for example, whenever the encrypted replication data 126 is decrypted, when the migrated resources 130 are created at the service provider system 100, and so forth).

A customer's primary resource in a KMS 110 are KEKs 138. In some embodiments, a user 116 can create a KEK 138 using an interface 144 (for example, via a console or API) to request creation of a new KEK 138, where the request optionally includes an alias for the KEK, users and roles that can administer the KEK, users and roles that can use the KEK to encrypt and decrypt data, and so forth. Typically, a KEK 138 is used to protect data encryption keys 140 which can be used to encrypt or decrypt larger amounts of data outside of the KMS 110. For example, a KEK 138 generally does not leave the KMS 110 unencrypted; however, data encryption keys can leave the KMS 110 (and the service provider system 100 entirely) unencrypted. In some embodiments, the exchange of data encryption keys between a KMS 110 and components external to the KMS can be encrypted using a public key encryption-based mechanism such as HTTPS or any other type of secure communication channel.

When a component of a service provider system 100 or an external component (for example, a backup proxy 146) requests a new data encryption key 140 from a KMS 110, the KMS 110 returns a plaintext copy of the data encryption key and a ciphertext that contains the data encryption key encrypted under a KEK 138 specified in the request. To protect data locally (for example, for a backup proxy 146 to encrypt replication data 124 to obtain encrypted replication data 126), a component can encrypt the data using the plaintext data encryption key, erase the plaintext data encryption key from memory, and store the encrypted copy of the data encryption key alongside the encrypted data.

As indicated above, when a component encrypts data using a data encryption key 140, the component may store an encrypted copy of the data encryption key in association with the encrypted data. Thus, when the same or a different component desires to decrypt the encrypted data (for example, when a server migration service 102 desires to decrypt encrypted replication data 126 to create decrypted replication data 128), it can send a request to the KMS 110 including a copy of the encrypted data encryption key and an identifier of the KEK 138. If the requesting component has permissions to decrypt the data encryption key, the KMS 110 decrypts the encrypted data encryption key using the identified KEK 138 and sends an unencrypted copy of the data encryption key to the requesting component. The ability for various components to encrypt and decrypt data encryption keys 140 using a particular KEK 138 can be managed by the customer using permissions set as part of a key policy for each KEK 138.

In some embodiments, customers can also optionally delete or disable a KEK 138. For example, if a customer is not satisfied or worried about the security of data encrypted under a particular KEK 138, the customer may choose to delete the KEK 138 via an interface 144. Once a KEK 138 is deleted, any data that was encrypted under that KEK (including any data encrypted using a data encryption key 140 that is itself encrypted under the deleted KEK) can no longer be decrypted, meaning the data becomes essentially unrecoverable. A customer can alternatively disable a KEK 138 to prevent the KMS 110 from using the KEK to encrypt or decrypt data but allowing the customer to reenable the KEK at a later time, if desired. This ability to control access to encrypted data (for example, to encrypted replication data 126, migrated resources 130, and so forth) may provide customers with additional confidence about the security of their data migrated to the service provider system 100.

In some embodiments, log data generated by logging/auditing services 150 and other secure migration process metadata (for example, information received as part of a secure migration request 132 identifying servers to be migrated or identifying a KEK to use, URLs exchanged between a backup proxy 146 and server migration service 102 identifying a storage location of encrypted replication data 126, and any other data used to coordinate a secure migration) can be encrypted using data encryption keys 140 obtained from a KMS 110 or using other encryption mechanisms.

In some embodiments, the encryption of replication data 124 can be performed by a VM management server 122 or another component responsible for managing VMs 120. For example, in response to receiving a request from a backup proxy 146 to generate a snapshot of a VM 120, a VM management server 122 may generate and encrypt the snapshot before sending the snapshot to the backup proxy 146. In some embodiments, a VM management server 122 can use a data encryption key 136 obtained from a KMS 110 to encrypt the replication data 124; in other examples, a VM management server 122 may use a different encryption mechanism to deliver encrypted replication data 126 to the backup proxy 146 and the backup proxy 146 can decrypt and re-encrypt the replication data using a data encryption key 140 obtained from the KMS 110.

In an embodiment, at circle "4," a backup proxy 146 encrypts replication data 124 using the data encryption key obtained from the KMS 110 to obtain encrypted replication data 126. In some embodiments, a backup proxy 146 can request a new data encryption key 140 for each secure migration request or, alternatively, a backup proxy 146 may reuse data encryption keys 140 for one or more separate secure migration requests.

In an embodiment, at circle "5," the backup proxy 146 sends, or "uploads," the encrypted replication data 126 to a storage virtualization service 112 and, at circle "6," the backup proxy 146 sends a message informing the server migration service 102 that the encrypted migration data is stored in the storage virtualization service 112. For example, the backup proxy 146 can upload the encrypted replication data 126 to a bucket or folder created by the backup proxy 146 to store the data at the storage virtualization service 112 and, in return from the storage virtualization service 112, may receive a Uniform Resource Locator (URL) or other identifier of the location at which the data is stored. In some embodiments, the URL can be a "pre-signed" URL which grants time-limited permission to one or more other entities to access (for example, to download or copy) the data stored at the location identified by the pre-signed URL. In some embodiments, a backup proxy 146 sends the encrypted replication data 126 to the storage virtualization service 112 via an encrypted network connection, for example, using the HTTPS protocol. Although HTTPS and other similar protocols typically rely on short-term session keys generated based on long-term public and private keys verified by a certificate authority to encrypt data, in some embodiments, a KMS 110 and an encryption scheme based on the customer's own KEK 138 may be used to secure a network communication link between a backup proxy 146 and a service provider system 100.

As indicated above, a server migration service 102 receives a message from a backup proxy 146 identifying the location at the storage virtualization service 112 at which the encrypted replication data 126 is stored. In one embodiment, the server migration service 102 forwards the request to an import/export service 118 (for example, via one or more API calls) and specifies the storage location of the encrypted replication data 126 at the storage virtualization service 112. Although shown as component of the server migration service 102 in FIG. 1, in various embodiments, the import/export service 118 can be a separate service of the service provider system 100 or may be a partially or entirely integrated component of the server migration service 102. In general, an import/export service 118 may perform some or all of the operations involved in migrating a server at the service provider system 100 including the generation of migrated resources 130. In some embodiments, the generation of migrated resources 130 by an import/export service 118 can include one or more of: downloading the encrypted replication data 126 from the storage virtualization service 112, obtaining a data encryption key 140 from the KMS 110, decrypting the encrypted replication data 126 to obtain decrypted replication data 126, creating encrypted disk volume(s) (for example, at a storage service which may be part of or separate from storage virtualization service 112), converting the downloaded replication data into a format for storage in the created disk volume(s), storing the converted data in the volume(s), injecting drivers into the volume(s), performing a test boot of a migrated VM contained in the volume(s), generating encrypted snapshots of the migrated VM, generating a machine image of the migrated VM that can be used to create VM instances at the service provider system 100 (for example, using a separate hardware virtualization service), and storing the machine image, volume(s), and snapshot(s) at a storage location accessible to the customer account. In other embodiments, one or more of the above operations may be performed by a server migration service 102 or another component of the service provider system 100.

At circle "7A," the import/export service 118 requests and downloads the encrypted replication data 126 from the storage virtualization service 112. For example, the import/export service 118 can send a request to the storage virtualization service 112 using a pre-signed URL or other identifier provided to the server migration service 102 by the backup proxy 146 to access and download the encrypted replication data 126.

At circle "7B," the import/export service 118 obtains a copy of the same data encryption key 136 from the KMS 110 as that used by the backup proxy 146 to encrypt the replication data at the customer's on-premises data center 108. As described above, in an embodiment, when the backup proxy 146 generates the encrypted replication data 126, it may store an encrypted copy of the data encryption key 140 used to encrypt the replication data alongside the encrypted replication data 126 (for example, as part of metadata stored with the data). To obtain an unencrypted copy of the data encryption key, the import/export service 118 can send a request to the KMS 110 including a copy of the encrypted data encryption key 140 and an identifier of the associated KEK 138 (which the import/export service 118 may receive via the secure migration request 132 or the confirmation message sent from the backup proxy 146 at circle "6" in FIG. 1). Assuming the import/export service 118 has permissions to decrypt data, the KMS 110 can then decrypt the encrypted data encryption key 140 using the identified KEK 138 and send the unencrypted data encryption key 140 to the import/export service 118. At circle "8," the import/export service 118 uses the obtained unencrypted data encryption key 140 to obtain decrypted replication data 128. In general, the decrypted replication data 128 may be the same or substantially the same as the original replication data 124 generated by the backup proxy 146 at the customer data center 108.

In an embodiment, the import/export service 118 can create migrated resources 130 based on the decrypted replication data 128. As indicated above, in an embodiment, the server migration service 102, import/export service 118, or other components of the service provider system 100 comprise utilities to generate migrated resources that can be launched as compute instances in a hardware virtualization service of the service provider system 100 or used for other purposes. The migrated resources 130, for example, can include any type of data that can be used to replicate a customer's on-premises VM 120 at the service provider system 100 such as disk volume(s), disk snapshot(s), machine images, and so forth, each of which can be optionally encrypted using the data encryption key 136 or another encryption key.

In an embodiment, processes similar to those described above can be used to securely migrate incremental "snapshots" of a VM 120. For example, a backup proxy 146 can be instructed by a server migration service 102 to create a "delta" snapshot of a VM previously migrated into the service provider system 100, encrypt the delta snapshot, and upload the encrypted delta snapshot to a storage virtualization service 112. Similarly, the server migration service 102 or import/export service 118 can download the uploaded encrypted delta snapshot, decrypt the delta snapshot, and create migrated resources based on the delta snapshot. This may be useful, for example, for customers desiring to test server migrations incrementally to ensure that their on-premises servers work as intended in the service provider system 100 before switching over entirely.

The example operations described above in relation to FIG. 1 involve the use and exchange of data (for example, replication data and migrated resources) among a number of separate components (for example, a backup proxy 146, storage virtualization service 112, KMS 110, server migration service 102, import/export service 118, and so forth) including some components that may be associated with a customer account and some that may be associated with one or more "service accounts" (an account controlled by the service provider system 100). For example, operations performed under a customer account may include generating the initial secure migration request, the backup proxy obtaining and uploading replication data to the service provider system, and the storage of machine images and snapshots at a storage location accessible to the customer account. Other "service accounts" may be associated with various operations at the service provider system 100 including, for example, the import/export service 118 downloading and storing a copy of the encrypted replication data from the storage virtualization service 112, generating the migrated resources 130, testing the migrated resources 130 before copying the resources to storage associated with the customer account, and so forth. In some instances, the operations spanning these various accounts may result in copying large amounts of data from one account to another, thereby increasing the time to complete the migration process.

In one embodiment, some or all of the operations involved in securely migrating a server from a customer's data center to a service provider system 100, as described above, can instead be performed within a customer's "virtual private cloud" (VPC) of computing resources provided by the service provider system 100 (and thereby in association with the customer's account instead of a service account). At a high level, a VPC is a service that allows customers to provision a logically isolated section of resources provided by a service provider system 100. In these examples, the server migration service may be configured to instruct components within the VPC to perform some or all of the operations described above in relation to the import/export service 118 and other components. In other embodiments, various mixtures of these approaches can be used such that more or fewer of the operations are performed in association with a customer account compared to service accounts.

Figure 2:
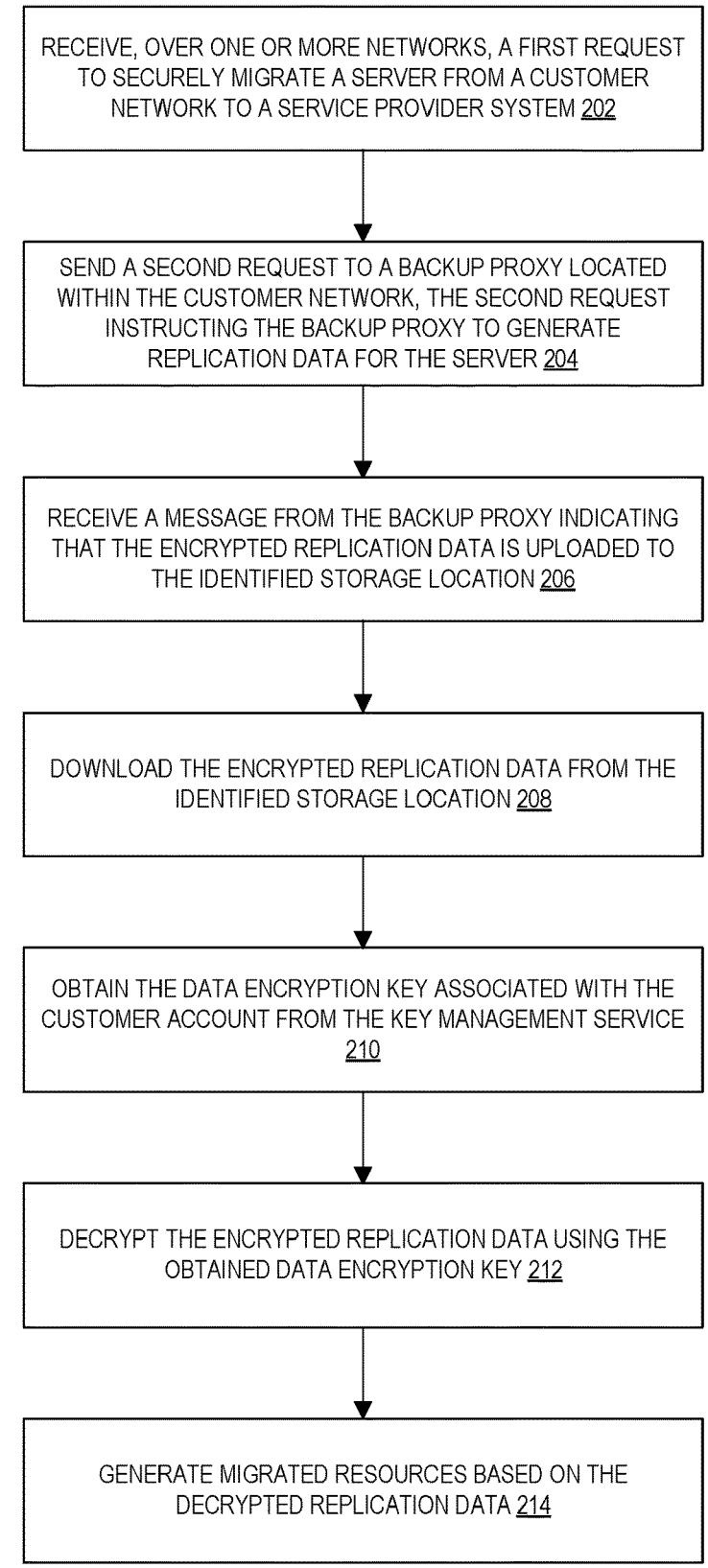
FIG. 2 is a flow diagram illustrating operations performed by a server migration service to securely migrate a server located within a customer's network to a service provider system according to some embodiments.
Figure 3:
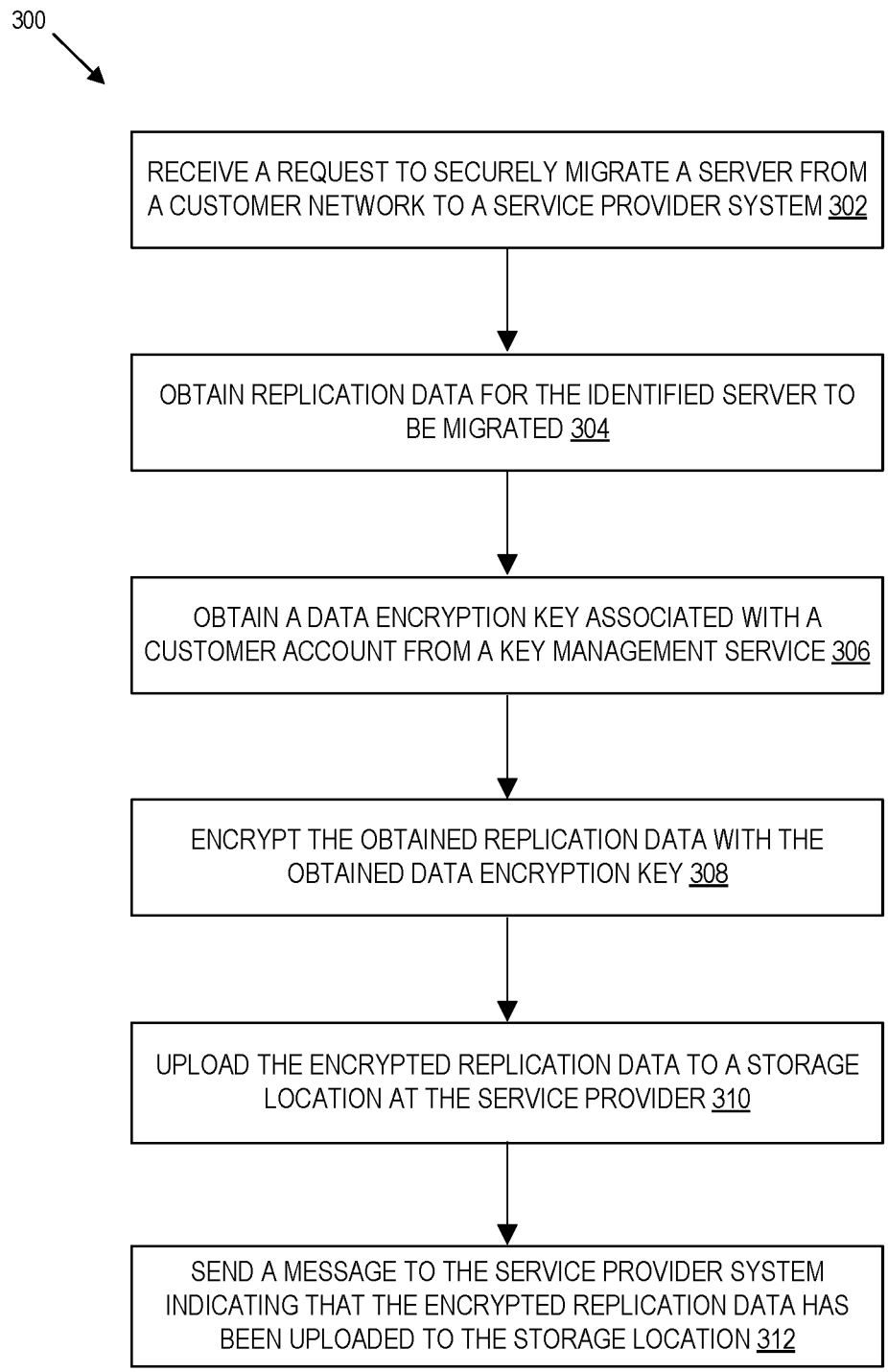
FIG. 3 is a flow diagram illustrating operations performed by a backup proxy located within a customer's network to securely migrate a server located within the customer's network to a service provider system according to some embodiments.

For further details, FIG. 2 and FIG. 3 are flow diagrams illustrating operations 200 and 300 for the secure migration of servers to a service provider system. Some or all of the operations 200 and 300 (or other processes described herein, or variations, or combinations thereof) are performed under the control of one or more computer systems configured with executable instructions and are implemented as code (for example, executable instructions, one or more computer programs, or one or more applications) executing collectively on one or more processors by hardware or combinations thereof. The code can be stored on a computer-readable storage medium, for example, in the form of a computer program comprising instructions executable by one or more processors. The computer-readable storage medium is non-transitory. In some embodiments, one or more (or all) of the operations 200 and 300 are performed by a server migration service 102, an import/export service 118, a backup proxy 146, and possibly other components of the other figures.

In some embodiments, the operations 200 include, at block 202, receiving, over one or more networks, a first request to securely migrate a server (for example, a VM or a physical server) from a customer network to a service provider system. Referring again to FIG. 1, for example, a server migration service 102 may receive the first request (for example, a secure migration request 132) in response to a user 116 using a console or other interface 144 to generate the request. In an embodiment, the first request includes an identifier of the server (for example, an identifier of a VM or physical server 120) to be migrated and an identifier of a master encryption key (for example a KEK 138). In an embodiment, the first request is an HTTP request received at an API endpoint of the service provider system.

At block 204, a second request is sent to a backup proxy located within the customer network, the second request instructing the backup proxy to generate replication data. For example, a server migration service 102 can send the second request (for example, secure migration command 134) to a backup proxy 146 and include with the request one or more of: an identifier of the VM or physical server 120 to be migrated and the identifier of the master encryption key associated with the customer account and specified by the user at block 202.

Referring now to FIG. 3, operations 300 include operations performed by a backup proxy 146 in response to receiving the second request (for example, a secure migration command 134). At block 302, the backup proxy receives the second request to migrate the identified server. As described above, a backup proxy 146 may receive a second request from a service provider system 100 using either a push or pull mechanism. In an embodiment, the second request includes one or more of: an identifier of the server to be migrated and an identifier of the master encryption key associated with the customer account.

At block 304, the backup proxy obtains replication data for the identified server to be migrated. For example, a backup proxy 146 may obtain the replication data from a VM management server 122 (which generates the replication data for the identified VM 120) or directly from the identified VM or physical server 120. The replication data can include, for example, disk snapshots, memory snapshots, or any other data to be used by a server migration service 102 to create migrated resources 130 corresponding to the identified server at the service provider system 100. In some embodiments, a VM management server 122 can encrypt the generated replication data prior to sending the replication data to the backup proxy 146) using an encryption key obtained from a KMS 110 or using any other encryption mechanism. In an embodiment, the backup proxy 146 obtaining the replication data can include obtaining one or more of: a disk snapshot from a VM manager used to manage the identified server, a disk snapshot of a physical server corresponding to the identified server, a data stream reflecting changes to a disk associated with the identified server.

At block 306, the backup proxy obtains a data encryption key associated with the customer account from a key management service. For example, a backup proxy 146 can obtain a data encryption key 140 from a KMS 110 by sending a request to the KMS 110 including an identifier of the master encryption key (for example, a KEK 138) included in the second request received by the backup proxy 146. In an embodiment, obtaining the data encryption key from the key management service can include obtaining a plaintext copy of the data encryption key and a copy of the data encryption key encrypted using the identified master encryption key. In one embodiment, a backup proxy 146 can obtain a separate data encryption key for each migration or may reuse data encryption keys across migration requests.

At block 308, the backup proxy encrypts the replication data using the obtained data encryption key to obtain encrypted replication data. For example, a backup proxy 146 may use the data encryption key obtained at block 306 to encrypt replication data 124 using the Advanced Encryption Standard (AES) algorithm or any other key-based encryption process.

At block 310, the backup proxy uploads the encrypted replication data to a storage location at the service provider system. For example, the backup proxy 146 may create a folder, "bucket," or other type of storage location at a storage virtualization service 112 of the service provider system 100 and upload the encrypted replication data 126 to the created storage location (for example, using a URL or other identifier associated with the storage location). In an embodiment, the storage virtualization service 112 generates a pre-signed URL or other identifier of the storage location storing the uploaded data and sends the identifier to the backup proxy 146.

At block 312, the backup proxy sends a message to the service provider system indicating that the encrypted replication data has been uploaded to the storage location. In an embodiment, the message includes an identifier of the storage location (for example, the URL or other identifier received from the storage virtualization service 112). Once a backup proxy 146 has uploaded encrypted replication data 126 to the storage location and informed the service provider system 100, the backup proxy 146 optionally can delete any artifacts of the replication data generation process (for example, obtained disk snapshot(s), encrypted replication data, and so forth). In other embodiments, the backup proxy 146 can locally store some or all of the generated replication data, for example, to use when generating "delta" snapshots of the server at a later time. In one embodiment, the backup proxy can send the message informing the service provider system 100 of the uploaded encrypted replication data 126 using a message queueing service, API request, or any other type of messaging.

Returning to FIG. 2, at block 206, the server migration service receives the message from the backup proxy indicating that the encrypted replication data has been uploaded to the identified storage location and, at block 208, uses the storage location identifier included in the message to download the encrypted replication data and perform various migration operations. For example, a server migration service 102 may instruct an import/export service 118 to download the encrypted replication data 126 from the storage virtualization service 112. In various embodiments, some or all of the operations involved in obtaining encrypted replication data from a storage virtualization service and performing various migration operations can be performed by a server migration service, an import/export service, other components of a service provider system, or combinations thereof.

At block 210, the server migration service obtains the data encryption key associated with the customer account from the key management service. For example, the server migration service 102 or import/export service 118 may send a request to the KMS 110 to obtain a data encryption key 140 to be used to decrypt the encrypted replication data 126, the request including an encrypted copy of the data encryption (for example, obtained from the encrypted replication data) and an identifier of a master encryption key (for example, obtained from the secure migration request 132 or the confirmation message sent at circle "6" in FIG. 1). At block 212, the server migration service decrypts the encrypted replication data using the obtained encryption key.

At block 214, the server migration service generates migrated resources based on the decrypted replication data. The migrated resources 130 can include any type of data that can be used to replicate the server requested for migration at the service provider system 100 such as, for example, disk volume(s), disk snapshot(s), machine images, and so forth. In an embodiment, generating the migrated resources at block 214 can include processes to test the operation of the migrated server at the service provider system 100. For example, a server migration service 102 or other component may inject drivers into the disk volume storing the decrypted and converted VM and perform a test boot of the VM, among other possible operations. In an embodiment, if the test boot is successful, the server migration service 102 creates a snapshot of the VM and stores the snapshot at a storage location accessible to the customer account. Optionally, the server migration service can encrypt the snapshot using the same data encryption key used to encrypt the replicated data or using a new data encryption key. Using the snapshot, in an embodiment, the server migration service 102 creates and encrypts a machine image that can be used, for example, to create VM instances within a hardware virtualization service at the service provider system 100 or elsewhere.

As indicated above, in an embodiment, a server migration service 102 optionally can encrypt one or more of the migrated resources using a same or different encryption key as that used to encrypt the replication data uploaded to the service provider system 100. In this manner, the data (for example, replication data 124 and migrated resources 130) used to migrate a server from a customer network to a service provider system 100 can be encrypted at each point of the migration process—that is, when the data is at rest in the customer network, in transit from the customer network to the service provider system, and again at rest in the service provider system.

Figure 4:
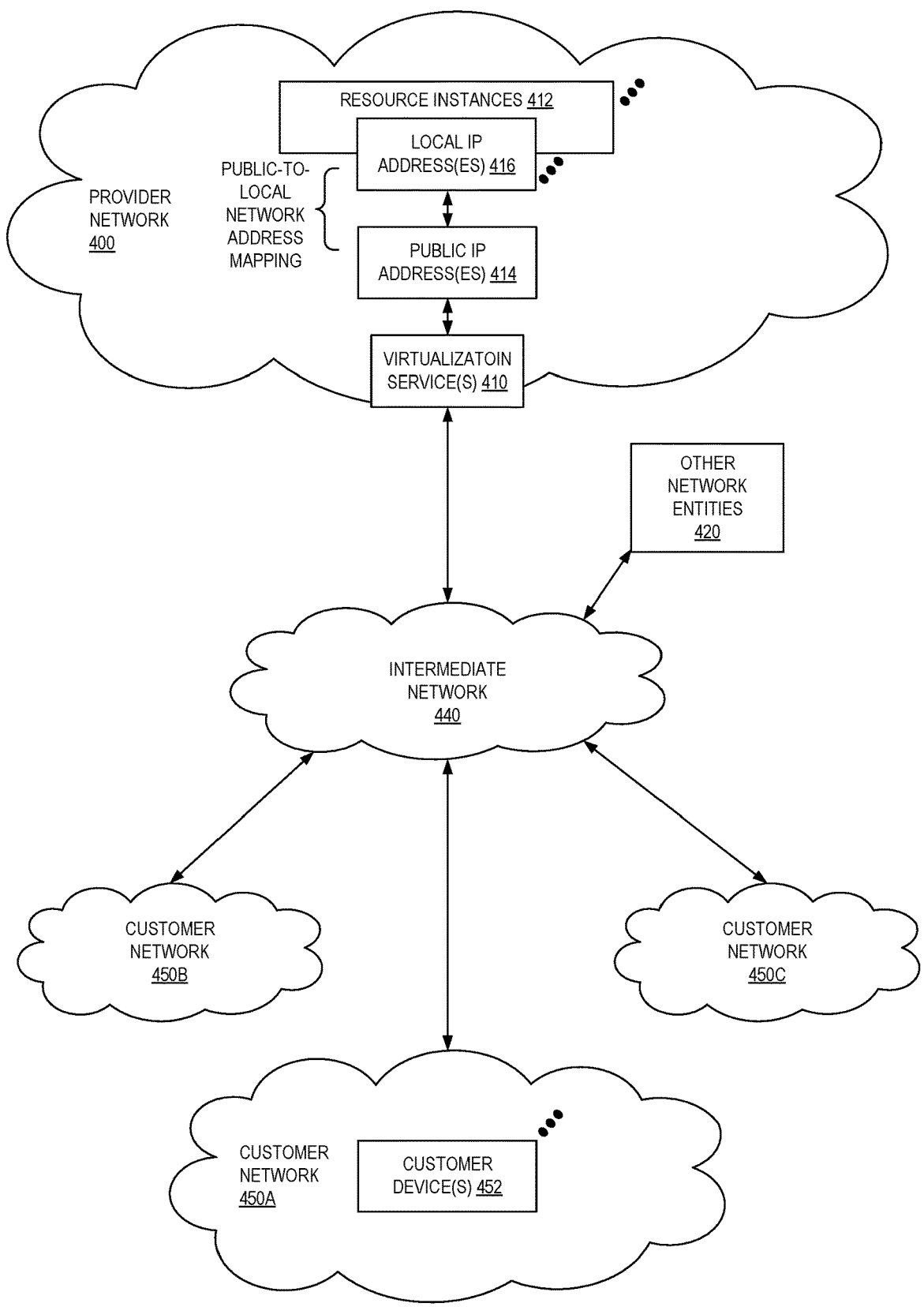
FIG. 4 illustrates an example service provider network environment according to some embodiments.

In some embodiments, a server migration service 102 can cause the generation of log data related to one or more of the operations described in relation to FIGS. 3 and 4. For example, a server migration service 102 may send requests to logging/auditing service(s) 150 to generate log data related to one or more of: the server migration service 102 receiving the first request at block 202, sending the second request to the backup proxy at block 204, receiving the message from the backup proxy indicating that the encrypted replication data is uploaded to the identified storage location at block 206, obtaining the encrypted replication data from the storage location at the service provide system at block 208, obtaining the data encryption key associated with the customer account from the KMS 110 at block 210, decrypting the encrypted replication data at block 212, generating the migrated resources at block 214, and so forth. The generated log data can be associated with the customer account used to initiate the secure migration process so that the same user can inspect the log data (for example, via one or more interfaces 144 used to interact with the logging/auditing service(s) 150). In some embodiments, a backup proxy 146, storage virtualization service 112, KMS 110, and other components involved in the secure migration process can similarly send requests to generate log data related to operations performed by each of the components. In other embodiments, each of the components described above may generate log data locally that can be accessed directly from the components or indirectly via the logging/auditing services 150. The generated log data can be optionally encrypted using a same or different data encryption key obtained from a KMS 110 as that used to securely migrate the replication data.

FIG. 4 illustrates an example provider network (for example, part of a "service provider system") environment, according to some embodiments. A provider network 400 may provide resource virtualization to customers via one or more virtualization services 410 that allow customers to purchase, rent, or otherwise obtain instances 412 of virtualized resources including, but not limited to, computation and storage resources. The virtualization service 410 can be implemented on devices within the provider network or networks in one or more data centers. Local IP addresses 416 may be associated with the resource instances 412; where the local IP addresses are the internal network addresses of the resource instances 412 on the provider network 400. In some embodiments, the provider network 400 may also provide public IP addresses 414 and/or public IP address ranges (for example, Internet Protocol version 4 (IPv4) or Internet Protocol version 6 (IPv6) addresses) that customers may obtain from the provider 400.

Conventionally, the provider network 400, via the virtualization services 410, may allow a customer of the service provider (for example, a customer that operates one or more client network 450A-450C including one or more customer device(s) 452) to dynamically associate at least some public IP addresses 414 assigned or allocated to the customer with particular resource instances 412 assigned to the customer. The provider network 400 may also allow the customer to remap a public IP address 414, previously mapped to one virtualized computing resource instance 412 allocated to the customer, to another virtualized computing resource instance 412 that is also allocated to the customer. Using the virtualized computing resource instances 412 and public IP addresses 414 provided by the service provider, a customer of the service provider such as the operator of customer network 450 may, for example, implement customer-specific applications and present the customer's applications on an intermediate network 440, such as the internet. Other network entities 420 on the intermediate network 440 may then generate traffic to a destination public IP address 414 published by the customer network 450; the traffic is routed to the service provider data center and, at the data center, is routed via a network substrate to the local IP address 416 of the virtualized computing resource instance 412 currently mapped to the destination public IP address 414. Similarly, response traffic from the virtualized computing resource instance 412 may be routed via the network substrate back onto the intermediate network 440 to the source entity 420.

Local IP addresses, as used herein, refer to the internal network addresses of resource instances in a provider network. Local IP addresses are only mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are internet mutable network addresses that are assigned to resource instances, either by the service provider or by the customer. Traffic routed to a public IP address is translated, for example, via 1:1 network address translation (NAT), and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 400; a customer may then assign their allocated public IP addresses to particular resource instances allocated to the customer. These public IP addresses may be referred to as customer public IP addresses, or simply customer IP addresses. Instead of being assigned by the provider network 400 to resource instances as in the case of standard IP addresses, customer IP addresses may be assigned to resource instances by the customers, for example, via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 5:
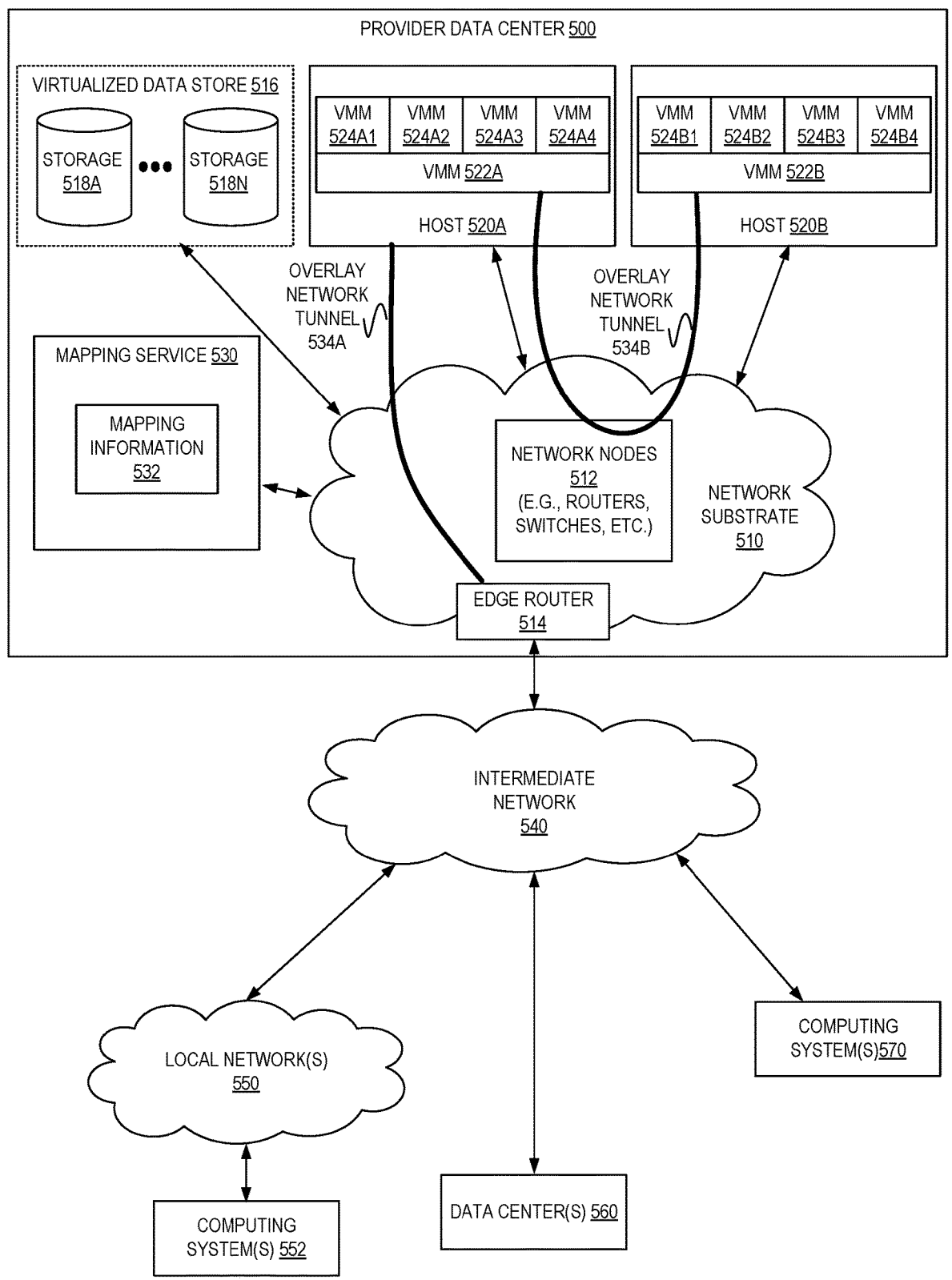
FIG. 5 illustrates an example data center that implements an overlay network on a network substrate using IP tunneling technology according to some embodiments.

FIG. 5 illustrates an example data center that implements an overlay network on a network substrate using IP tunneling technology, according to some embodiments. A provider data center 500 may include a network substrate that includes networking devices 512 such as routers, switches, network address translators (NATs), and so on. Some embodiments may employ an Internet Protocol (IP) tunneling technology to provide an overlay network via which encapsulated packets may be passed through network substrate 510 using tunnels. The IP tunneling technology may provide a mapping and encapsulating system for creating an overlay network on a network (for example, a local network in data center 500 of FIG. 5) and may provide a separate namespace for the overlay layer (the public IP addresses) and the network substrate 510 layer (the local IP addresses). Packets in the overlay layer may be checked against a mapping directory (for example, provided by mapping service 530) to determine what their tunnel substrate target (local IP address) should be. The IP tunneling technology provides a virtual network topology (the overlay network); the interfaces (for example, service APIs) that are presented to customers are attached to the overlay network so that when a customer provides an IP address to which the customer wants to send packets, the IP address is run in virtual space by communicating with a mapping service (for example, mapping service 530) that knows where the IP overlay addresses are.

In some embodiments, the IP tunneling technology may map IP overlay addresses (public IP addresses) to substrate IP addresses (local IP addresses), encapsulate the packets in a tunnel between the two namespaces, and deliver the packet to the correct endpoint via the tunnel, where the encapsulation is stripped from the packet. In FIG. 5, an example overlay network tunnel 534A from a virtual machine (VM) 524A on host 520A to a device on the intermediate network 550 and an example overlay network tunnel 534B between a VM 524B on host 520B and a VM 524C on host 520C are shown. In some embodiments, a packet may be encapsulated in an overlay network packet format before sending, and the overlay network packet may be stripped after receiving. In other embodiments, instead of encapsulating packets in overlay network packets, an overlay network address (public IP address) may be embedded in a substrate address (local IP address) of a packet before sending, and stripped from the packet address upon receiving. As an example, the overlay network may be implemented using 32-bit IPv4 (Internet Protocol version 4) addresses as the public IP addresses, and the IPv4 addresses may be embedded as part of 128-bit IPv6 (Internet Protocol version 6) addresses used on the substrate network as the local IP addresses.

Referring to FIG. 5, at least some networks in which embodiments may be implemented may include hardware virtualization technology that enables multiple operating systems to run concurrently on a host computer (for example, hosts 520A and 520B of FIG. 5), that is, as VMs 524 on the hosts 520. The VMs 524 may, for example, be executed in slots on the hosts 520 that are rented or leased to customers of a network provider. A hypervisor, or virtual machine monitor (VMM) 522, on a host 520 presents the VMs 524 on the host with a virtual platform and monitors the execution of the VMs 524. Each VM 524 may be provided with one or more local IP addresses; the VMM 522 on a host 520 may be aware of the local IP addresses of the VMs 524 on the host. A mapping service 530 may be aware of all network IP prefixes and the IP addresses of routers or other devices serving IP addresses on the local network. This includes the IP addresses of the VMMs 522 serving multiple VMs 524. The mapping service 530 may be centralized, for example, on a server system, or alternatively may be distributed among two or more server systems or other devices on the network. A network may, for example, use the mapping service technology and IP tunneling technology to, for example, route data packets between VMs 524 on different hosts 520 within the data center 500 network; note that an interior gateway protocol (IGP) may be used to exchange routing information within such a local network.

In addition, a network such as the provider data center 500 network (which is sometimes referred to as an autonomous system (AS)) may use the mapping service technology, IP tunneling technology, and routing service technology to route packets from the VMs 524 to Internet destinations, and from Internet sources to the VMs 524. Note that an external gateway protocol (EGP) or border gateway protocol (BGP) is typically used for Internet routing between sources and destinations on the Internet. FIG. 5 shows an example provider data center 500 implementing a network that provides resource virtualization technology and that provides full Internet access via edge router(s) 514 that connect to Internet transit providers, according to some embodiments. The provider data center 500 may, for example, provide customers the ability to implement virtual computing systems (VMs 524) via a hardware virtualization service and the ability to implement virtualized data stores 516 on storage resources 518 via a storage virtualization service.

The data center 500 network may implement IP tunneling technology, mapping service technology, and a routing service technology to route traffic to and from virtualized resources, for example, to route packets from the VMs 524 on hosts 520 in data center 500 to Internet destinations, and from Internet sources to the VMs 524. Internet sources and destinations may, for example, include computing systems 570 connected to the intermediate network 540 and computing systems 552 connected to local networks 550 that connect to the intermediate network 540 (for example, via edge router(s) 514 that connect the network 550 to Internet transit providers). The provider data center 500 network may also route packets between resources in data center 500, for example, from a VM 524 on a host 520 in data center 500 to other VMs 524 on the same host or on other hosts 520 in data center 500.

A service provider that provides data center 500 may also provide additional data center(s) 560 that include hardware virtualization technology similar to data center 500 and that may also be connected to intermediate network 540. Packets may be forwarded from data center 500 to other data centers 560, for example, from a VM 524 on a host 520 in data center 500 to another VM on another host in another, similar data center 560, and vice versa.

While the above describes hardware virtualization technology that enables multiple operating systems to run concurrently on host computers as VMs on the hosts, where the VMs may be instantiated on slots on hosts that are rented or leased to customers of the network provider, the hardware virtualization technology may also be used to provide other computing resources, for example, storage resources 518, as virtualized resources to customers of a network provider in a similar manner.

Figure 6:
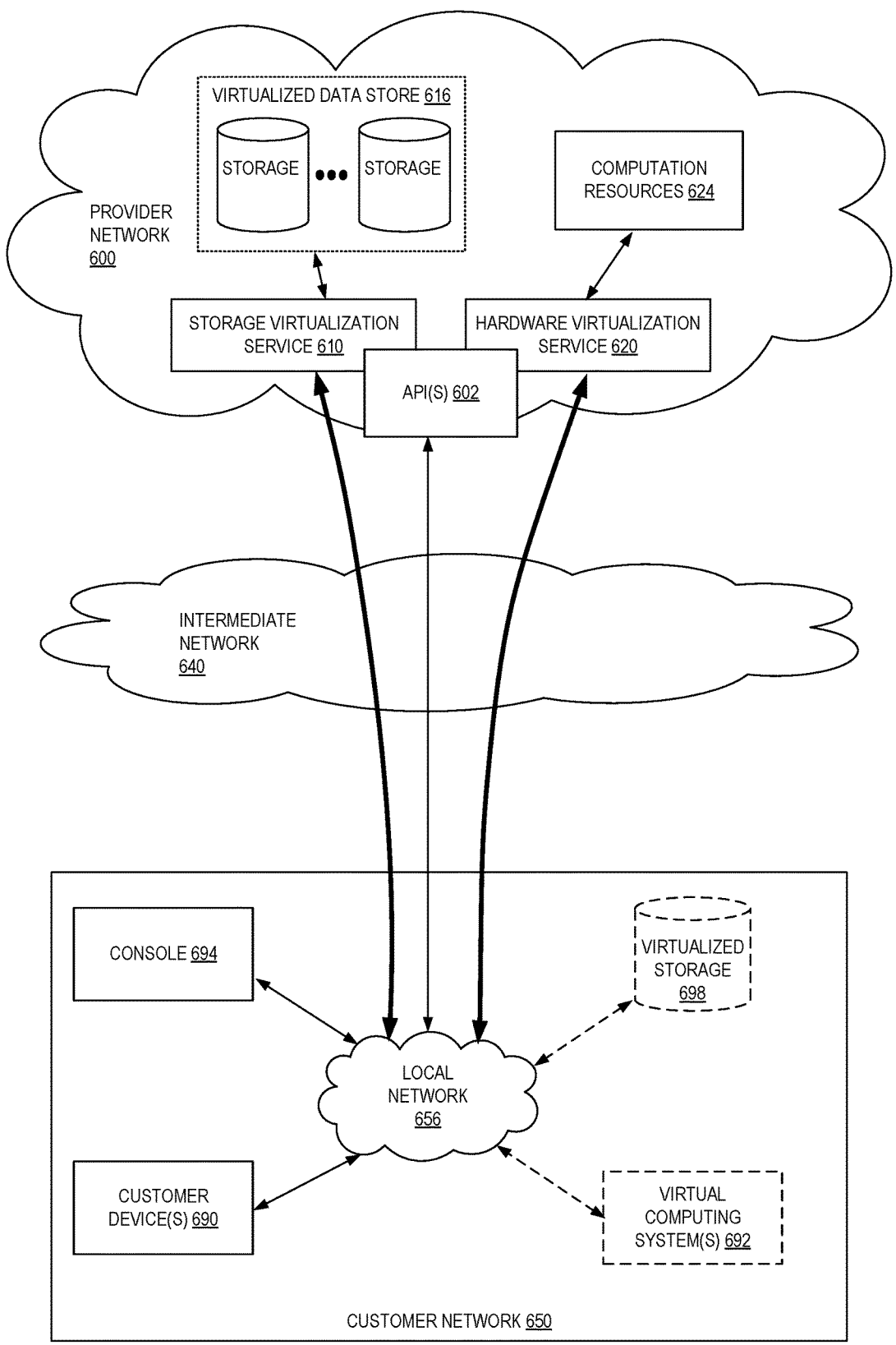
FIG. 6 is a block diagram of an example service provider network that provides a storage virtualization service and a hardware virtualization service to customers according to some embodiments.

FIG. 6 is a block diagram of an example provider network that provides a storage virtualization service and a hardware virtualization service to customers, according to some embodiments. Hardware virtualization service 620 provides multiple computation resources 624 (for example, VMs) to customers. The computation resources 624 may, for example, be rented or leased to customers of the provider network 600 (for example, to a customer that implements customer network 650). Each computation resource 624 may be provided with one or more local IP addresses. Provider network 600 may be configured to route packets from the local IP addresses of the computation resources 624 to public Internet destinations, and from public Internet sources to the local IP addresses of computation resources 624.

Provider network 600 may provide a customer network 650, for example, coupled to intermediate network 640 via local network 656, the ability to implement virtual computing systems 692 via hardware virtualization service 620 coupled to intermediate network 640 and to provider network 600. In some embodiments, hardware virtualization service 620 may provide one or more APIs 602, for example, a web services interface, via which a customer network 650 may access functionality provided by the hardware virtualization service 620, for example, via a console 694. In some embodiments, at the provider network 600, each virtual computing system 692 at customer network 650 may correspond to a computation resource 624 that is leased, rented, or otherwise provided to customer network 650.

From an instance of a virtual computing system 692 and/or another customer device 690 or console 694, the customer may access the functionality of storage virtualization service 610, for example, via one or more APIs 602, to access data from and store data to a virtual data store 616 provided by the provider network 600. In some embodiments, a virtualized data store gateway (not shown) may be provided at the customer network 650 that may locally cache at least some data, for example, frequently accessed or critical data, and that may communicate with virtualized data store service 610 via one or more communications channels to upload new or modified data from a local cache so that the primary store of data (virtualized data store 616) is maintained. In some embodiments, a user, via a virtual computing system 692 and/or on another customer device 690, may mount and access virtual data store 616 volumes, which appear to the user as local virtualized storage 698.

While not shown in FIG. 6, the virtualization service(s) may also be accessed from resource instances within the provider network 600 via API(s) 602. For example, a customer, appliance service provider, or other entity may access a virtualization service from within a respective virtual network on the provider network 600 via an API 602 to request allocation of one or more resource instances within the virtual network or within another virtual network.

Illustrative System

Figure 7:
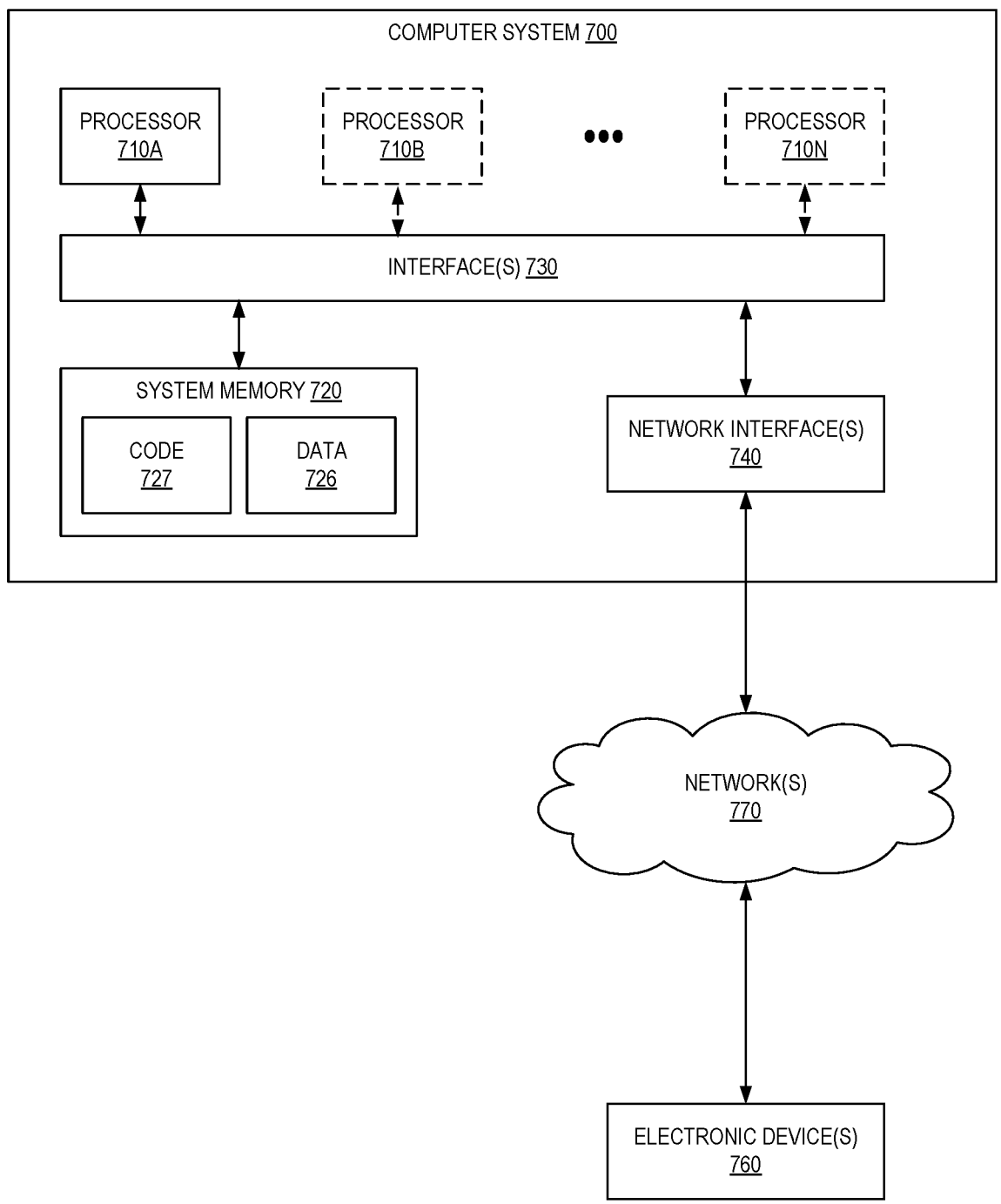
FIG. 7 is a block diagram illustrating an example computer system that may be used in some embodiments.

In some embodiments, a system that implements a portion or all of the techniques for self-organizing server migration to service provider system environments as described herein may include a general-purpose computer system that includes or is configured to access one or more computer-accessible media, such as computer system 700 illustrated in FIG. 10. In the illustrated embodiment, computer system 700 includes one or more processors 710 coupled to a system memory 720 via an input/output (I/O) interface 730. Computer system 700 further includes a network interface 740 coupled to I/O interface 730. While FIG. 7 shows computer system 700 as a single computing device, in various embodiments a computer system 700 may include one computing device or any number of computing devices configured to work together as a single computer system 700.

In various embodiments, computer system 700 may be a uniprocessor system including one processor 710, or a multiprocessor system including several processors 710 (for example, two, four, eight, or another suitable number). Processors 710 may be any suitable processors capable of executing instructions. For example, in various embodiments, processors 710 may be general-purpose or embedded processors implementing any of a variety of instruction set architectures (ISAs), such as the x86, PowerPC, SPARC, or MIPS ISAs, or any other suitable ISA In multiprocessor systems, each of processors 710 may commonly, but not necessarily, implement the same ISA.

System memory 720 may store instructions and data accessible by processor(s) 710. In various embodiments, system memory 720 may be implemented using any suitable memory technology, such as static random-access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for resizing virtual networks in provider network environments, are shown stored within system memory 720 as code 727 and data 726.

In one embodiment, I/O interface 730 may be configured to coordinate I/O traffic between processor 710, system memory 720, and any peripheral devices in the device, including network interface 740 or other peripheral interfaces. In some embodiments, I/O interface 730 may perform any necessary protocol, timing or other data transformations to convert data signals from one component (for example, system memory 720) into a format suitable for use by another component (for example, processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. Also, in some embodiments some or all of the functionality of I/O interface 730, such as an interface to system memory 720, may be incorporated directly into processor 710.

Network interface 740 may be configured to allow data to be exchanged between computer system 700 and other devices 760 attached to a network or networks 770, such as other computer systems or devices as illustrated in FIG. 1, for example. In various embodiments, network interface 740 may support communication via any suitable wired or wireless general data networks, such as types of Ethernet network, for example. Additionally, network interface 740 may support communication via telecommunications/telephony networks such as analog voice networks or digital fiber communications networks, via storage area networks such as Fibre Channel SANs, or via I/O any other suitable type of network and/or protocol.

In some embodiments, system memory 720 may be one embodiment of a computer-accessible medium configured to store program instructions and data for implementing a server migration service in a provider network environment. However, in other embodiments, program instructions and/or data may be received, sent or stored upon different types of computer-accessible media. Generally speaking, a computer-accessible medium may include non-transitory storage media or memory media such as magnetic or optical media, for example, disk or DVD/CD coupled to computer system 700 via I/O interface 730. A non-transitory computer-accessible storage medium may also include any volatile or non-volatile media such as RAM (for example, SDRAM, double data rate (DDR) SDRAM, SRAM, etc.), read only memory (ROM), etc., that may be included in some embodiments of computer system 700 as system memory 720 or another type of memory. Further, a computer-accessible medium may include transmission media or signals such as electrical, electromagnetic, or digital signals, conveyed via a communication medium such as a network and/or a wireless link, such as may be implemented via network interface 740.

Various embodiments may further include receiving, sending, or storing instructions and/or data implemented in accordance with the foregoing description upon a computer-accessible medium. A computer-accessible medium may include storage media or memory media such as magnetic or optical media, for example, disk or DVD/CD-ROM, volatile or non-volatile media such as RAM (for example, SDRAM, DDR, RDRAM, SRAM, etc.), ROM, etc., as well as transmission media or signals such as electrical, electromagnetic, or digital signals, conveyed via a communication medium such as network and/or a wireless link.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (for example, large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters may be used to indicate that there can be one or multiple instances of the referenced entity in some embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The various methods as illustrated in the figures and described herein represent exemplary embodiments of methods. The methods may be implemented in software, hardware, or a combination thereof. The order of the methods may be changed, and various elements may be added, reordered, combined, omitted, modified, etc. Thus, various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A computer-implemented method comprising:
   receiving, over one or more networks, a first request to securely migrate a virtual machine (VM) from a customer network to a service provider system, wherein the first request includes an identifier of a key encryption key (KEK) associated with a customer account of the service provider system, and wherein the customer network is managed by an entity that is separate from an entity that manages the service provider system;
   sending a second request to a backup proxy located within the customer network, wherein the second request includes an identifier of the KEK, and wherein the second request causes the backup proxy to:
      generate replication data for the VM,
      obtain a data encryption key associated with the KEK from a key management service (KMS),
      encrypt the replication data using the data encryption key to obtain encrypted replication data, and
      upload the encrypted replication data to a storage location at the service provider system;
   obtaining the encrypted replication data from the storage location at the service provider system;
   obtaining the data encryption key associated with the customer account from the KMS, wherein the data encryption key is obtained based on the identifier of the KEK;
   decrypting the encrypted replication data using the data encryption key to obtain decrypted replication data; and
   generating, based on the decrypted replication data, a VM image to be used to create migrated VM instances at the service provider system.

2. The computer-implemented method of claim 1, wherein the data encryption key is a plaintext copy of the data encryption key, wherein the backup proxy further obtains an encrypted copy of the data encryption key, and wherein the second request further causes the backup proxy to:
    store the encrypted copy of the data encryption key in association with the encrypted replication data.

3. The computer-implemented method of claim 1, further comprising sending one or more requests to a logging service to generate log data related to one or more of: receiving the first request to securely migrate the VM, sending the second request to the backup proxy, obtaining the encrypted replication data from the storage location at the service provider system, obtaining the data encryption key associated with the customer account from the KMS, decrypting the encrypted replication data using the data encryption key, or generating the VM image.

4. A computer-implemented method comprising:
    receiving, at a service provider system, a first request to securely migrate a virtual machine (VM) from a customer network to the service provider system, wherein the first request includes an identifier of a key encryption key (KEK) associated with a customer account of the service provider system;
    sending, over one or more networks, a second request to a backup proxy located within the customer network, wherein the second request instructs the backup proxy to securely migrate the VM from the customer network to the service provider system, and wherein the second request includes an identifier of the KEK to be used by the backup proxy to obtain, from a key management service (KMS) of the service provider system, a data encryption key associated with the customer account;
    obtaining encrypted replication data uploaded by the backup proxy to the service provider system, wherein the encrypted replication data is generated by the backup proxy using the data encryption key obtained by the backup proxy from the KMS using the identifier of the KEK;
    obtaining the data encryption key associated with the customer account from the KMS using the identifier of the KEK;
    decrypting the encrypted replication data using the data encryption key associated with the customer account to obtain decrypted replication data; and
    generating, based on the decrypted replication data, computing resources to be used to create migrated VM instances at the service provider system.

5. The computer-implemented method of claim 4, wherein the data encryption key is a plaintext copy of the data encryption key, and wherein the encrypted replication data further includes an encrypted copy of the data encryption key encrypted by KEK.

6. The computer-implemented method of claim 4, further comprising sending one or more requests to a logging service to generate log data related to one or more of: receiving a request to securely migrate the VM, sending the request to the backup proxy located within the customer network, obtaining the encrypted replication data uploaded by the backup proxy to the service provider system, obtaining the data encryption key associated with the customer account from the KMS, decrypting the encryption replication data using the data encryption key associated with the customer account, and generating computing resources to be used to create migrated server instances at the service provider system.

7. The computer-implemented method of claim 4, wherein the encrypted replication data includes one or more of: a disk snapshot, a memory snapshot, or a machine image.

8. The computer-implemented method of claim 4, further comprising encrypting, using the data encryption key associated with the customer account, at least part of the computing resources to be used to create the migrated VM instances at the service provider system.

9. The computer-implemented method of claim 4, wherein the computing resources to be used to create migrated VM instances at the service provider system include one or more of: a disk snapshot, a memory snapshot, a machine image, or a disk volume.

10. The computer-implemented method of claim 4, wherein generating the computing resources to be used to create migrated VM instances at the service provider system comprises:
    creating a disk volume,
    converting the decrypted replication data to a format for storage in the disk volume to obtain a migrated VM,
    storing the migrated VM in the disk volume,
    injecting drivers into the disk volume,
    performing a test boot of the migrated VM stored in the disk volume,
    creating a snapshot of the migrated VM stored in the disk volume,
    creating a machine image of the migrated VM based on the snapshot, and
    storing the machine image at a storage location accessible to the customer account.

11. The computer-implemented method of claim 4, wherein the backup proxy generates the encrypted replication data in part by obtaining one or more of:
    a disk snapshot from a VM manager used to manage the VM,
    a disk snapshot of a physical server corresponding to the VM, or
    a data stream reflecting changes to a disk associated with the VM.

12. The computer-implemented method of claim 4, wherein generating a VM image to be used to create migrated VM instances at the service provider system includes one or more operations performed within a virtual private cloud (VPC) associated with the customer.

13. A system comprising:
    a first one or more electronic devices comprising a processor to implement a server migration service, the server migration service comprising instructions which, when executed by the first one or more electronic devices, cause the server migration service to:
        receive, at a service provider system, a first request to securely migrate a virtual machine (VM) from a customer network to the service provider system, wherein the first request includes an identifier of a key encryption key (KEK) associated with a customer account of the service provider system;
        send, over one or more networks, a second request to a backup proxy located within the customer network, wherein the second request instructs the backup proxy to securely migrate the VM from the customer network to the service provider system, and wherein the second request includes an identifier of the KEK to be used by the backup proxy to obtain, from a key management service (KMS) of the service provider system, a data encryption key associated with the customer account,
        obtain encrypted replication data uploaded by the backup proxy to the service provider system, wherein the encrypted replication data is generated by the backup proxy using the data encryption key obtained by the backup proxy from the KMS using the identifier of the KEK, obtain the data encryption key associated with the customer account from the KMS using the identifier of the KEK, decrypt the encrypted replication data using the data encryption key associated with the customer account to obtain decrypted replication data, and generate, based on the decrypted replication data, computing resources to be used to create migrated VM instances at the service provider system; and a second one or more electronic devices to implement the KMS, the KMS comprising instructions which, when executed by the second one or more electronic devices, cause the KMS to:

receive, from the server migration service, a request for the data encryption key, the request including an identifier of a master encryption key associated with the customer account, obtain the data encryption key based on the identifier of the master encryption key associated with the customer account, and send, to the server migration service, the data encryption key.

14. The system of claim 13, wherein the data encryption key is a plaintext copy of the data encryption key, and wherein the encrypted replication data includes an encrypted copy of the data encryption key encrypted by the KEK.

15. The system of claim 13, wherein the instructions, when executed by the first one or more electronic devices, further cause the server migration service to send one or more requests to a logging service to generate log data related to one or more of: receiving a request to securely migrate the server, sending the request to the backup proxy located within the customer network, obtaining the encrypted replication data uploaded by the backup proxy to the service provider system, obtaining the data encryption key associated with the customer account from the KMS, decrypting the encryption replication data using the data encryption key associated with the customer account, and generating computing resources to be used to create migrated server instances at the service provider system.

16. The system of claim 13, wherein the replication data includes one or more of: a disk snapshot, a memory snapshot, or a machine image.

17. The system of claim 13, wherein the instructions, when executed by the first one or more electronic devices, further cause the server migration service to encrypt, using the data encryption key associated with the customer account, at least part of the replication data using the encryption key.

18. The system of claim 13, wherein the computing resources to be used to create migrated VM instances at the service provider system include one or more of: a disk snapshot, a memory snapshot, a machine image, or a disk volume.

19. The system of claim 13, wherein generating the computing resources to be used to create migrated VM instances at the service provider system comprises:

creating a disk volume, converting the decrypted replication data to a format for storage in the disk volume to obtain a migrated VM, storing the migrated VM in the disk volume, injecting drivers into the disk volume, performing a test boot of the migrated VM stored in the disk volume, creating a snapshot of the migrated VM stored in the disk volume, creating a machine image of the migrated VM based on the snapshot, and storing the machine image at a storage location accessible to the customer account.

20. The system of claim 13, wherein the replication data is generated by the backup proxy based on obtaining one or more of:

a disk snapshot from a VM manager used to manage the server, a disk snapshot of a physical server corresponding to the server, or a data stream reflecting changes to a disk associated with the server.

* * * * *